United States Patent [19]

Cooke et al.

[11] Patent Number: 4,537,631
[45] Date of Patent: * Aug. 27, 1985

[54] INK JET INK FORMULATION FOR REDUCED START-UP PROBLEMS

[75] Inventors: Theodore M. Cooke, Danbury; Robert A. Lin, New Town; Richard G. Whitfield, Brookfield; Allan G. Hock, New Milford, all of Conn.

[73] Assignee: Exxon Research and Engineering Co., Florham Park, N.J.

[*] Notice: The portion of the term of this patent subsequent to Aug. 23, 2000 has been disclaimed.

[21] Appl. No.: 522,837

[22] Filed: Aug. 12, 1983

Related U.S. Application Data

[63] Continuation of Ser. No. 327,994, Dec. 7, 1981, Pat. No. 4,400,215.

[51] Int. Cl.$^3$ .............................................. C09D 11/02
[52] U.S. Cl. ......................................... 106/22; 106/27
[58] Field of Search ............................... 106/22, 20, 27

[56] References Cited

U.S. PATENT DOCUMENTS

| | | | |
|---|---|---|---|
| 3,653,932 | 4/1972 | Berry et al. | 106/22 |
| 3,715,219 | 2/1973 | Kurz et al. | 106/22 |
| 4,153,467 | 5/1979 | Yano et al. | 106/20 |
| 4,165,399 | 8/1979 | Germonprez | 427/264 |
| 4,243,994 | 1/1981 | Kobayashi et al. | 346/140 |
| 4,281,329 | 7/1981 | Yano et al. | 346/1.1 |
| 4,386,961 | 6/1983 | Lin | 106/22 |

OTHER PUBLICATIONS

Abstract No. 47097C/27 "Quick-Drying Ink for Ink Jet Recording—Comprises Oil-Soluble Dye, Alcohol Amine and Volatile Polar Solvent".
Abstract No. 06955B/04 "Oily Ink Compsn. for Stamping, Recording, Jet Printing, etc.—Can Be used on Plastic, Glass, Metal, Wood, etc. Is Not Sticky and Has Good Water-Resistance".
Abstract No. 43987C/25 "Non-Impact Recording Process—By Forming Images or Recording Substrate Using Water-or Oil-Based Ink Applying Toner to Images and Fixing Toner".
Abstract No. 45784C/26 "Quick-Drying Ink for Ink Jet Recording—Contains Oil-Soluble Dyes, Alcohol-amine(s) and Polyvalent Alcohol Derivs".
Abstract No. 89298X/48 "Ink Composns. for Ink Injection Type Recording Appts.—Prepared by Dissolving or Dispersing Oil Soluble Dye Dissolved in Liquid Fatty Acid in Aromatic Hydrocarbon Opt. Contg. Nonionic Surfactant".
Abstract of Jap. Ser. No. 77/17,758 "Magnetic Ink-Jet Printing Process".
Abstract No. 107587 "Inks for Ink-Jet Recording".
Abstract No. J3503 C/39 "Ink Jet Printer With Uniform Droplets—Uses Resistance Healing Elements to Control Generation of Ink Jet Droplets".
Abstract No. K5010 C/44 "High Speed Recording Equipment Drop Generator—Has Heating Element Producing Bubbles Near End of Fine Tube".
Abstract No. L6528 C/49 "Print Head for Ink Jet Printer—With Discharge Orifice Has Inbuilt Electro-Thermal Heating Space".
Abstract No. J55145-774 "Low Softening Point Ink for Ink-Jet Recording—Contains Water Soluble Dye, Polyhydric Alcohol and Aliphatic Monohydric Alcohol".
Abstract No. 80083B/44 "Recording Medium for Ink--Jet Recording Process Comprises Colourant, Solvent and A Substance that Liberates a Vapour When Heated".
Abstract No. 35067C/20 "Ink Jet Recording Head—With Heating Element at Junction of Liquid Inlet and Inclined Expulsion Zone".
Abstract 702458/39 "Ink for Hot Ink Jet Recording Process-Contains Recording Component Decompsing at Temp. Well Above b.pt. of Solvent or Dispersion Medium".
Abstract No. 169865-EG "Hot-Melt Electrostatic Printing Ink".
Abstract No. 11796S-EG "Electrostatic Printing Ink Compn.".

*Primary Examiner*—Paul Lieberman
*Assistant Examiner*—Amelia B. Yarbrough

[57] ABSTRACT

An ink jet ink formulated to substantially reduce or eliminate start-up problems when an ink jet apparatus is initially discharged. The ink comprises at least two fluid components. The components have been matched to provide an ink that substantially maintains its initial formulation despite evaporation of the components.

10 Claims, No Drawings

INK JET INK FORMULATION FOR REDUCED START-UP PROBLEMS

This is a continuation of application Ser. No. 327,994, filed Dec. 7, 1981, now U.S. Pat. No. 4,400,215.

FIELD OF THE INVENTION

This invention relates to ink jet ink formulations, and more particularly to an ink jet ink and methods of eliminating or at least reducing problems associated with start-up when an ink jet apparatus is initially discharged.

BACKGROUND OF THE INVENTION

The problems associated with ink jet start-up are legion and notorious. Start-up problems include: (1) misfiring or non-firing of the initial ink droplets; and (2) slower initial ink droplet velocities.

Poor start-up is generally believed to be a result of evaporation of the ink in the nozzle of the ink jet during an idle period between firings.

Heretofore, such problems have been always addressed in a mechanical or electrical sense, i.e. added pulses or signals were used to discharge the initial drop of ink in order to prevent misfiring, and to accelerate the ink drop to normal operating speed.

To the best of our knowledge and belief, no one has ever tried to formulate an ink which would prevent or substantially reduce start-up problems.

To the best of our knowledge and belief, no one has ever realized that a blending of ink fluid components could eleviate problems associated with ink jet start-up.

The present invention was discovered quite by accident during the scientific and engineering research of formulating ink jet compositions using oleic acid, as taught in our U.S. patent application Ser. No. 248,551 filed: Mar. 27, 1981; now U.S. Pat. No. 4,361,843.

During the aforementioned research, it was noted that one particular formulation always started properly during initial discharge of the ink jet. This formulation comprised by approximate weight: 30 percent oleic acid; 20 percent Typophor Black (30% weight of Nigrosine and 70% weight of oleic acid); and 50 percent benzyl ether.

Analysis of this formulation revealed that the oleic acid and benzyl ether had similar boiling points and low vapour pressures. It was then decided to formulate other ink compositions with components having matching boiling points and/or vapour pressures to see whether they too would exhibit a freedom from start-up problems. It was indeed observed that these new compositions were also free from start-up problems.

The chemistry is not yet fully understood regarding all the parameters which enter into the method of blending ink components to reduce start-up problems. Other factors, such as viscosity, may play a part in properly matching ink fluid components. At this time, however, it is safe to state that the matching of vapour pressures and/or boiling points of the components reduces to a significant degree the aforesaid problem.

It is believed that the matching of vapour pressure and/or boiling points produces an ink whose components evaporate at substantially similar or equal rates, thus providing an ink that maintains its initial formulation percentages despite evaporation. It is believed that this phenomenon results in the elimination of the problems associated with start-up.

It should also be obvious in view of the above discovery, that components having a lower vapour pressure, such as oleic acid, would be most desirable for use in the invention.

BRIEF SUMMARY OF THE INVENTION

The invention pertains to ink jet formulations and a method for eliminating or substantially reducing start-up problems when an ink jet apparatus is initially discharged. The ink jet ink is formulated to comprise at least two fluid components. The components are matched with respect to either or both of their vapour pressures and/or boiling points. These parameters are matched to provide an ink whose components have substantially similar evaporation rates. Thus, the initial ink formulator will be maintained despite evaporation of each component from the ink.

When an ink jet ink is so formulated, the tendency for the ink jet apparatus to improperly discharge during initial start-up will be substantially reduced or eliminated.

Non-aqueous, oil-based ink components with low evaporation rates are preferred in the invention, such as oleic acid, castor oil, etc.

Matching components for such oil-based components can be aromatic ethers or high molecular weight alcohols.

Another component of such an ink formulation may by a pyrrolidone.

Naturally, such ink formulations must contain a dye component.

The ink jet ink is preferred to have a surface tension of at least approximately 35 dynes/cm at operating temperature.

The invention can be utilized with a wide variety of apparatuses, and the inventive formulations are not limited to any specific types or classes of fluid components, in so far as they are each matched to provide the benefits and purposes of the described invention.

It is an object of this invention to provide an ink jet ink and method for substantially eliminating or at least reducing the tendency of an ink jet apparatus to improperly discharge during initial start-up.

The above object and other such objects will be better understood and will become more apparent with reference to the following detailed description.

DETAILED DESCRIPTION OF THE INVENTION

Generally speaking the invention features ink jet ink formulations and a method for substantially eliminating or at least reducing some or all of the problems associated with improper discharge of the ink jet apparatus during initial start-up.

Each fluid component of the ink is matched with other components of the ink with respect to its vapour pressure and/or boiling point. This will provide an ink whose components all evaporate at substantially the same rate.

The following typical ink jet inks in Table I below, have been formulated to substantially reduce or eliminate start-up problems. Each formulation has components that are matched to provide similar evaporation rates.

TABLE I

| PROPER START-UP INK FORMULATIONS | | | | | | | | |
|---|---|---|---|---|---|---|---|---|
| Oleic Acid (360° C. B.P. decomposes) | — | 15.8 | 16.0 | 2.0 | 15.0 | 10.0 | 5.0 | 5.0 |
| Benzyl ether (288° C. B.P.) | — | 60.0 | 60.0 | 55.6 | 47.5 | 50.3 | 53.6 | 60.0 |
| N—Cyclohexyl-2-Pyrrolidone (284° C. B.P.) | — | — | 10.0 | — | — | — | — | — |
| N—(2-Hydroxyethyl)-2-Pyrrolidone (295° C. B.P.) | — | — | — | 28.4 | 23.5 | 25.7 | 27.4 | 20.0 |
| Dibutyl Sebacate (344° C. B.P.) | 30 | — | — | — | — | — | — | — |
| Typophor Black | 70 | 24.0 | — | — | — | — | — | — |
| Calco ™ Chinoline Yellow | — | 0.2 | 1.0 | — | — | — | — | — |
| Calco ™ Nigrosine Base | — | — | 13.0 | 13.0 | 13.0 | 13.0 | 13.0 | 13.0 |
| Acetosol ™ Yellow (a chrom chelated yellow available from the Sandos company). | — | — | — | 1.0 | 1.0 | 1.0 | 1.0 | 2.0 |
| S.T. 76° F. | 32.0 | 36.2 | 36.3 | 38.7 | | 36.4 | 37.0 | 37.9 |
| 135° F. | 29.8 | 33.0 | 34.9 | 37.0 | | 34.1 | 35.5 | 36.1 |
| Vis. 76° F. | 26.2 | 17.0 | 35.2 | 45.5 | 61.7 | 49.1 | 42.5 | |
| 135° F. | 9.5 | 9.0 | 10.4 | 11.9 | 11.9 | 12.0 | 12.7 | |

Having thus described the invention, what is desired to be protected by Letters Patent is presented by the following appended claims:

What is claimed is:

1. A ink jet ink comprising about 5–15 weight percent oleic acid, about 47.5 to 60.0 weight percent benzyl ether, and at least one dye component.

2. The ink jet ink of claim 1 further comprising about 20 to about 28 weight percent n-(2-hydroxyethyl)-2-pyrrolidone.

3. The ink jet ink of claim 2 further comprising about 14–15 weight percent of said dye component.

4. The ink jet ink of claim 1 wherein said dye component is selected from the group consisting of chinoline yellow, nigrosine base, chrom chelated yellow, typophor black and mixtures thereof.

5. The ink jet ink of claim 1 wherein the surface tension of said ink at operating temperature is about 32 to about 39 dynes/cm.

6. The ink jet ink of claim 1 further comprising n-cyclohexyl-2-pyrrolidone.

7. The ink jet ink of claim 6 comprising about 10 weight percent n-cyclohexyl-2-pyrrolidone.

8. An ink jet ink comprising dibutyl sebacate and typophor black.

9. The ink jet ink of claim 8 comprising about 30 weight percent dibutyl sebacate and about 70 weight percent typohor black.

10. The ink jet ink of claim 8 having surface tensions at between 76° F. and 135° F. of between about 29.8 and 32.0 dynes/cm.

* * * * *